United States Patent [19]

Benn et al.

[11] 4,157,790

[45] Jun. 12, 1979

[54] PRODUCTION OF LOW-FILLER RUBBER POWDERS BY THE GRINDING PROCESS

[75] Inventors: Otto Benn, Bergisch Gladbach; Rolf Cornils, Marne; Gerhard Giersiepen, Leichlingen, all of Fed. Rep. of Germany

[73] Assignee: Bayer Aktiengesellschaft, Leverkusen, Fed. Rep. of Germany

[21] Appl. No.: 844,261

[22] Filed: Oct. 21, 1977

[30] Foreign Application Priority Data

Oct. 26, 1976 [DE] Fed. Rep. of Germany ....... 2648301

[51] Int. Cl.² .............................................. B02C 23/06
[52] U.S. Cl. ..................................................... 241/22
[58] Field of Search ........................................... 241/22

[56] References Cited
U.S. PATENT DOCUMENTS

| | | | |
|---|---|---|---|
| 2,853,742 | 9/1958 | Dasher | 241/22 |
| 2,895,939 | 7/1959 | Stober et al. | 241/22 |
| 3,190,565 | 6/1965 | Jayne, Jr. | 241/22 |
| 3,580,519 | 5/1971 | Klein et al. | 241/22 |
| 3,648,937 | 3/1972 | Ehrreich | 241/22 |

*Primary Examiner*—Howard N. Goldberg
*Attorney, Agent, or Firm*—Connolly and Hutz

[57] ABSTRACT

A process for the production of rubber powder having a particle size of from about 200 to 1500 $\mu$ and a powdering agent content of less than 7% by weight by grinding rubber particles, wherein the rubber is initially mechanically size-reduced into surface-rich and pore-rich particles, the entire quantity of powdering agent is added to the rubber particles, which are then ground at low temperature to prevent the rubber from flowing, non-adsorbed or freshly added powdering agent is adsorbed by the rubber powder in a zone following the grinding machine, and the rubber powder obtained is cooled to such an extent that no warm flow of the rubber occurs.

3 Claims, 1 Drawing Figure

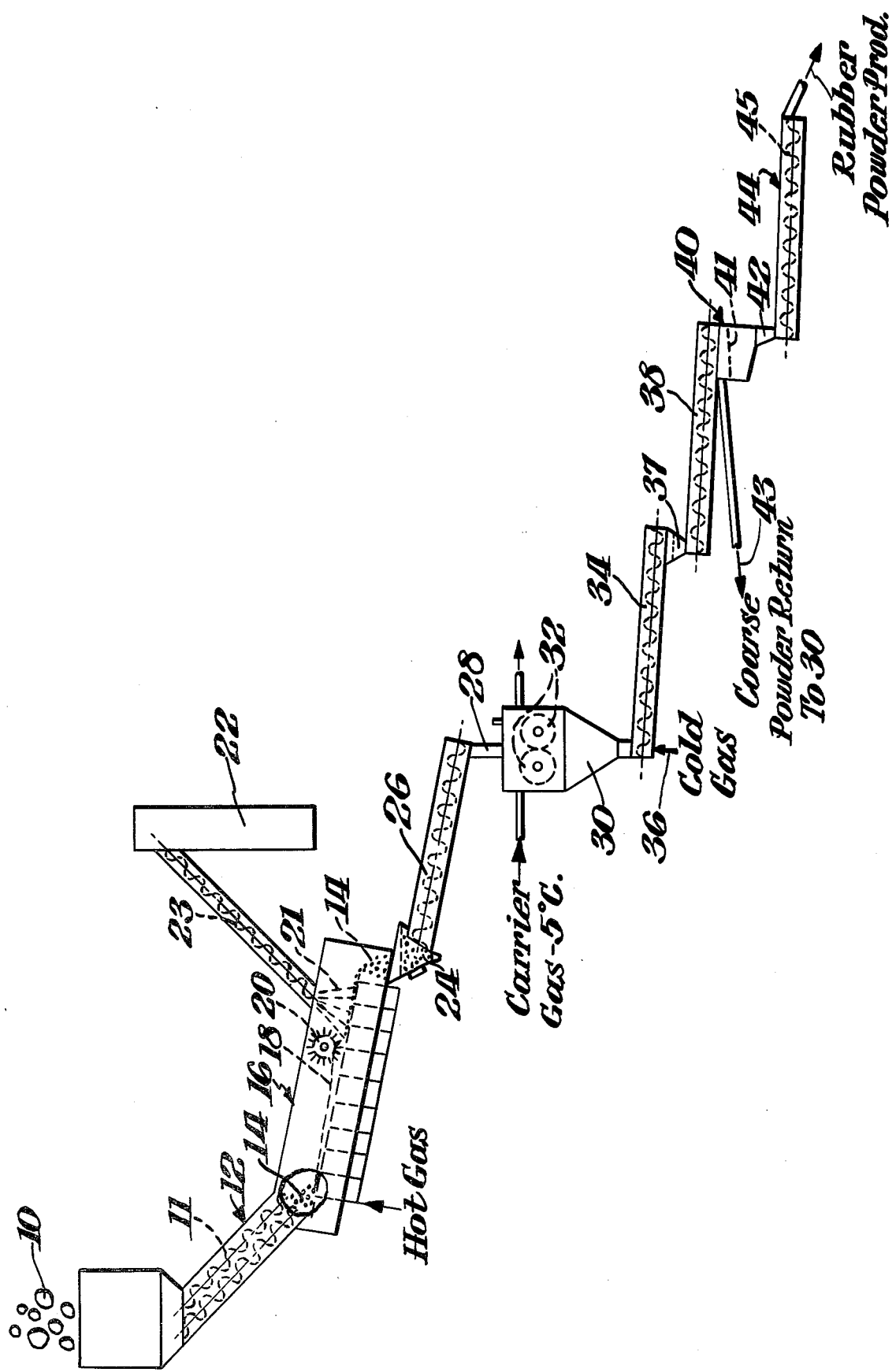

PRODUCTION OF LOW-FILLER RUBBER POWDERS BY THE GRINDING PROCESS

Powder-form rubbers can be obtained by grinding coarse rubber granulates in size-reducing machines. The powder thus produced shows the tackiness characteristic of rubbers and has a tendency to agglomerate. However, a high level of fluidity on the part of the powders is absolutely essential for their further processing.

Accordingly, fillers in the form of powdering agents are added to the rubber granulate during grinding in such a quantity that agglomeration does not occur and adequate fluidity is guaranteed. In conventional grinding processes, however, the powdering agents have to be added to the rubber in such a large quantity that, during further processing, the powdered rubber powder no longer has the properties, particularly the mechanical properties, of the unpowdered rubber.

The present invention relates to the production of rubber powders by the grinding process with only small additions of powdering agents. In order to obtain adequate fluidity, less than 7% by weight and, on average, from 2 to 5% by weight of powdering agent are added to the rubber.

In order to obtain the fluidity required for the further processing of the rubber powders with only small additions of fillers, the powdering agent is only added when the rubber has been transformed into a large-surface, highly porous particle form. The entire content of powdering agent is then sprayed into the pneumatically delivered flow of large-surface rubber particles. The quantity of powdering agent required for this purpose is measured in such a way that the rubber powder obtained on completion of the operation has a packing strength of from 20 to 30 lbs. The residence time in the pneumatic delivery zone is so long that as much as possible and, with advantage, all of the powdering agent is adsorbed in layers on the large-surface rubber particles. After the carrier gas has been separated off, the powder-laden rubber particles vibrated off the filter and any non-adsorbed powdering agent still present flow continuously and uniformly, distributed throughout the various particle sizes, through a rotary feeder into a down pipe which opens into the feed spout of the size-reducing machine. The described measures ensure that, before the grinding operation begins, there is a relatively uniform distribution between the powdered rubber particles and the non-adsorbed powder still present. It is only this precondition which contributes towards obtaining high fluidity of the ground rubber with only small additions of powdering agents. The features responsible for this are as follows: the residence time of the free powder still present during the grinding operation in the size-reducing machine amounts to only fractions of a second and, in the described process, to less than about 1/10 second. By virtue of the relatively uniform distribution between powdered rubber particles and the non-adsorbed powder still present, an evenly distributed supply of free powder is immediately available again for powdering the surfaces newly formed during the grinding operation. The uniform powdering of newly formed surfaces is more effectively obtained when the entire powdering agent is adsorbed onto the rubber particles.

Under the effect of the measures described above, rubber particles with a large surface on which the adsorbed powdering agent is uniformly distributed are introduced into the grinding operation, so that the ground rubber powder obtained flows freely despite its low filler content.

In cases where, for example, the powder is directly added to the size-reducing machine, known mechanical dosing units are unable to guarantee a uniform supply of powder for the surface reforming process on account of the short residence time of the powdering agent in the size-reducing machine. This results in uneven and inadequate powdering of the rubber powder with correspondingly impaired fluidity.

During the grinding operation, the rubber particles introduced are split open into irregularly shaped rubber particles with much larger surfaces. In addition to the powdered surfaces, powder accumulates in pores and indentations in the rubber powder. When, during storage of the rubber powder, cold flow occurs and new surfaces are formed, these accumulations of powder dispense the powder for the new surfaces. Accordingly, it is of considerable advantage to maintain this surface-rich state of the rubber powder. The heat generated during the grinding process is dependent upon the type of rubber, its plasticity, the degree of preliminary size reduction, the throughput, the interval between the grinding plates, the type of size-reducing machine used, etc., and produces an increase in temperature in the rubber powder. As a result, the surface-rich structure begins to flow and pores and indentations are smoothed out. In order to counteract this flow of the rubber during the grinding process and to keep intact the structure rich in pores and indentations, the stream of carrier gas introduced into the size-reducing machine is cooled as required. The size-reducing machine is also cooled.

The rubber powder issuing from the size-reducing machine and any non-adsorbed powder still present flow, for the purposes of repowdering, through another pneumatic delivery zone of such dimensions that the free powder is completely adsorbed by the surfaces of the rubber powder.

On completion of the grinding process, the individual rubber powder grain has an outwardly directed temperature gradient. As already mentioned, the increase in temperature which occurs during size-reduction in the machine is minimised by cooling the carrier gas. On account of the poor thermal conductivity of all types of rubber, the temperature prevailing inside the powder grain is higher than the temperature prevailing at its surface. Accordingly, the temperature is only equalised slowly througout the entire powder grain and, for the most part, the temperature equalisation process is only completed after packing, i.e. during storage of the rubber powder. An increase in temperature then occurs at the surface of the rubber powder and can give rise to the phenomenon of warm flow. This phenomenon results in the formation of new, smooth surfaces which can remain unpowdered and show a tendency to agglomerate. Accordingly, after it has been repowdered, the rubber powder is introduced into a cooling unit, for example a cooling screw, and is cooled to a temperature about 5° to 10° C. below the storage temperature, depending upon the type of rubber in question. The surface temperature is then low enough to ensure that no warm flow can occur.

By applying the measures described above, it is possible to convert natural and synthetic rubbers into low-filler rubber powders. The measures in question are applied with different emphasis according to the type of rubber in question and, for the same type of rubber, according to its plasticity.

The free-flowing low-filler rubber powders obtained are characterised by a particle size of from about 200 to 1500 μm. Particles with grain sizes above the required particle size range are returned to the grinding process. By using a sieving machine, it is possible if necessary to remove fractions, for example with a grain size limit of approximately 300 μm, from the above-mentioned particle size range. Baffle plate impact mills are particularly suitable for obtaining the above-mentioned grain size distribution in the grinding process.

Known fillers may be used as the powdering agents. The fillers or filler mixtures are used in different quantities, depending upon the type of rubber and its plasticity. It is possible in particular to use derivatives of silica, so-called active fillers and also metal salts of fatty acids (having 10–25 carbon atoms) and finely divided metal oxides or metal carbonates, such as magnesium oxide, zinc oxide or calcium carbonate, or even active carbon blacks. The requisite quantity of powdering agent is determined by measuring the fluidity of the rubber powder and is expressed by the packing strength according to ASTM D 1937-62 T in lbs. The lower limit for adequate fluidity is approximately 20 lbs. The rubber powders obtained by the process described herein give packing strengths of more than 30 lbs.

The characterised process may be used for any type of rubber, i.e. both natural and synthetic rubber. Production of the low-filler rubber powder by the grinding process is completed as follows:

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

The single FIGURE of the drawing is a schematic flow diagram illustrating the process for the production of rubber powder according to this invention.

The rubber is precipitated from the latices by known coagulation methods, washed and dried. The final drying operation is preferably carried out by granulating the rubber predried 10 in screws 11 of size reduction machine 12 thereby forming small disc or rectangle particle forms with a diameter or side dimensions of about 1 to 6 mm and a thickness of approximately 0.1 mm. These surface-rich and pore-rich discs 14 are dried with recirculated hot air, advantageously in a fluidised bed 16, to a residual moisture content of less than 0.5% by weight. During this final drying process, the discs or rectangles are compacted to form a moving, loose rubber sheet 18 which at the end of the fluidised bed 16 is broken up again into small surface-rich particles, for example by means of a spiked roller. Behind the spiked roller 20, the entire powdering agent 21 is introduced from a silo 22 with a screw conveyor 23 into the product stream of the pneumatically delivered surface-rich rubber particles. The requisite quantity of powdering agent is dependent upon the type of rubber and its consistency and is determined from the packing strength of the powdered rubber powder. If the packing strength amounts to more than 30 lbs, the quantity of powdering agent can be reduced. The dimensions of the flow tube and the residence times of the feed stock are such that the rubber particles flow freely and the powdering agent is adsorbed substantially completely onto the surfaces of the rubber particles. The non-adsorbed powdering agent still present is uniformly distributed between the rubber particles in the pneumatic delivery stream. For example, the diameter of the tube for an air throughput of about 3000 m³/h amounts to 25 cm, whilst the residence time of the rubber powder is in the range of from about 0.50 to 0.75 second for a tube length of 10 meters. The particles are separated from the delivery gas stream by means of a cloth filter 24. These powdered rubber particles thus separated and non-adsorbed powdering agent are continuously vibrated off the filters 24. The particles are introduced through a rotary feeder 26 into a vertical tube 28 20 cm in diameter which opens into the size-reducing machine. The rotary feeder establishes a uniform flow of product into the size-reducing machine 30. In order to guarantee this, the cloth filter 24 is vibrated at short time intervals (approximately 2 seconds), so that the product level in the discharge cone of the filter always lies above the rotary feeder 30.

About 50 to 500 kg of rubber per hour can be ground into powder, depending upon the size of the size-reducing machine. The required grain-size distribution of the rubber powder is obtained inter alia by correspondingly setting the interval between the grinding plates 32 of the size-reducing machine 30. The delivery gas is drawn through the size-reducing machine in such a quantity, for example 4000 m³/h, and at such a temperature, for example 5° C., that the temperature of the rubber powder in the size-reducing machine is low enough, for example between 30° and 70° C., to prevent flow.

If the rubber powder is not added to the rubber particles until they enter the size-reducing machine, the packing strength deteriorates for the reasons already explained. It is only by increasing the quantity of powdering agent that improved packing strength values can be obtained.

For example, more than 10% by weight of powdering agent has to be added to acrylonitrile-butadiene rubbers under the above-described conditions, but with direct introduction of the powdering agent into the Pallmann mill, in order to obtain packing strength values comparable with those obtained by the process according to the invention.

The product stream issuing from the size-reducing machine may contain non-adsorbed powder. Accordingly, the following flow tube 34 is dimensioned in such a way, for example with a length of about 15 meters and a diameter of 20 cm, that the residence time of the rubber powder in the tube is so long, for example 0.80 second, that the powdering agent is completely adsorbed by the rubber powder. In this way, the as yet unpowdered surfaces of the rubber powder are repowdered in the cold delivery gas stream 36. If necessary, this repowdering effect may be utilised in particular for spraying powdering agent into the beginning of the flow tube 26 behind the size-reducing machine 30.

The powdered rubber powder is separated off from the delivery gas stream by means of a cloth filter 37 and is delivered by a rotary feeder 38 to a sieving machine 40. A sieve 41 with a mesh width of, for example, 1500 μm retains the coarse particles and these are returned to the size-reducing machine 30. This coarse-particle return 43 advantageously amounts to between about 5 and 30% of the rubber input and is regulated by the interval between the grinding plates.

In this way, the return ratio can be usefully varied in dependence upon the required grain size spectrum, the heat of grinding and the total capacity of the size-reducing machine.

The sieved rubber powder 42 drops into a cooling unit 44, for example a cooling screw 45, and is cooled to a temperature about 5° to 10° C. below the storage temperature, depending upon the type of rubber in question. The rubber powder is packed either by way of a silo or directly. Cooling may also be carried out before the sieving operation. In the following examples all percentages and parts are by weight.

EXAMPLE 1

350 kg/h of finely cut surface-rich and pore-rich butadiene-acrylonitrile rubber having an average acrylonitrile content and a Mooney viscosity of 45 are delivered after final drying into a pneumatic delivery stream in which the speed of the particles is more than 25 m/second and their residence time is from 0.50 to 0.75 second. The entire powdering agent, 18 kg of active silica with particle sizes of less than 15 μm, is sprayed into the beginning of the pneumatic delivery stream. A filter with a surface area of 50 square meters separates the delivery air and continuously vibrates the product stream through a rotary feeder into the size-reducing machine. The interval between the baffle plates is set at about 1 mm and the diameter of the baffle plates is 80 cm. 4000 m$^3$/hour of air at 5° C. are drawn through the size-reducing machine. The product temperature on leaving the size-reducing machine is between 25° and 30° C. The rubber powder flows in a pneumatic delivery stream at a speed of more than 25 meters per second and with a residence time of about 1 second to a filter where it is separated from the delivery air. The powder passes through a rotary feeder onto a sieve having a mesh width of 1600 μm. Approximately 20% of coarse particles drop back into the size-reducing machine, whilst the sieved rubber powder is cooled in a screw to 10° C. and packaged.

EXAMPLE 2

Butadiene-acrylonitrile rubber having an average acrylonitrile content but a lower Mooney viscosity of 27 is treated in the same way as described in Example 1. However, the product temperature behind the size-reducing machine is kept below 15° C. and the final temperature of the rubber powder behind the cooling screw is kept below 5° C.

EXAMPLE 3

Butadiene-acrylonitrile rubber having a high acrylonitrile content and a Mooney viscosity of 65 is treated in the same way as described in Example 1. The powdering agent, which is used in a quantity of 18 kg per hour, consists of a mixture of 3 parts of active silica and 2 parts of zinc stearate and has a grain size of less than 15 μm.

EXAMPLE 4

Pre-crosslinked butadiene-acrylonitrile rubber having an average acrylonitrile content is treated in the same way as described in Example 1. The quantity of powdering agent used is 9 kg per hour and the interval between the baffle plates is 0.8 mm. The sieve has a mesh width of 1000 μm.

EXAMPLE 5

Gelled blends of butadiene-acrylonitrle rubber and polyvinyl chloride in a ratio of 50:50 to 70:30 and having a Mooney viscosity of approximately 75 are delivered in ribbon form to a cutting mill and then treated in the same was as described in Example 1.

EXAMPLE 6

Polychloroprene of average molecular weight is delivered in granulated form to a cutting mill and treated in the same way as described in Example 1. With this type of rubber the need for the surface-rich form of the particles to be present is not as pronounced as with other types of rubber. Instead repowdering after the size-reducing machine is of advantage. The final temperature of the rubber powder behind the cooling screw must be kept below 15° to 17° C.

EXAMPLE 7

Polychloroprene of high molecular weight is delivered in granulated form to a cutting mill and is treated in the same way as described in Example 6. 15 kg/h of magnesium oxide are sprayed in as powdering agent.

EXAMPLE 8

Styrene-butadiene rubber having a styrene content of 23.5% by weight and a Mooney viscosity of 50 is treated in the same way as described in Example 1. In order to obtain a high packing strength of the rubber powder, the surface-rich and pore-rich particle form of the product which enters the grinding operation in a highly plastic state has definitely to be present. The product temperature at the discharge end of the size-reducing machine is kept below 20° C. and the temperature of the rubber powder behind the cooling screw is kept below 80° C.

EXAMPLE 9

Styrene-butadiene rubber having a styrene content of 23.5% by weight and a Mooney viscosity of 115 is treated in the same way as described in Example 1. Since the material has a high Mooney viscosity, the surface-rich particle form required in Example 8 is not quite so necessary.

EXAMPLE 10

An ethylene-propylene-ethylidene norbornene terpolymer (ter.-component ethylidene norbornene, extremely rapid vulcanisation behaviour) having a Mooney viscosity of 42 is treated in the same way as described in Example 1. The powdering agent, which is used in a quantity of 18 kg per hour, consists of a mixture of 3 parts of active silica and 2 parts of zinc stearate and has a grain size of less than 15 μm.

EXAMPLE 11

An ethylene-propylene terpolymer (ter.-component dicyclopentadiene, normal vulcanisation behaviour) having a Mooney viscosity of 75 is treated in the same way as described in Example 1.

EXAMPLE 12

Ethylene-vinyl acetate copolymer having a vinyl acetate content of 45% by weight and a Mooney viscosity of 20 is treated in the same way as described in Example 1.

EXAMPLE 13

Natural rubber is treated in the same way as described in Example 1. The surface-rich and pore-rich particle form has definitely to be present before the grinding operation to ensure a high packing strength of the rubber powder. The product temperature on leaving the size-reducing machine is kept below 20° C. and the temperature of the rubber powder behind the cooling screw is kept below 8° C.

We claim:

1. A process for the production of rubber powder having a particle size of from 200 to 1500 μm and a powdering agent content of less than 7% by weight, which comprises converting the rubber by preliminary mechanical size-reduction into surface-rich and pore-rich particles; spraying the entire quantity of powdering agent into a pneumatically delivered stream of the rubber particle so that the powder is almost completely adsorbed by the rubber particles and surrounding powdering agent is delivered to the grinding operation with substantially uniform distribution between the powdered rubber particles; grinding the rubber particles at low temperature so that the rubber is prevented from flowing and the surface-rich and indentation-rich structure of the rubber powder particles formed by grinding is kept intact; allowing non-adsorbed or freshly introduced powdering agent to be adsorbed by the rubber powder in a pneumatic delivery zone following the grinding zone; and cooling the powdered rubber powder obtained to such an extent that no warm flow of the rubber occurs.

2. A process as claimed in claim 1, wherein the rubber particles formed by the preliminary mechanical size-reduction of the rubber have a thickness of about 0.1 mm and a diameter or side dimension of from about 1 to 6 mm.

3. A process as claimed in claim 1, wherein the low temperature required for the grinding operation is adjusted by cooling the delivery air of the stream of rubber particles.

* * * * *